United States Patent
Kasaiezadeh Mahabadi et al.

(10) Patent No.: US 11,175,667 B2
(45) Date of Patent: Nov. 16, 2021

(54) SYSTEM AND METHOD FOR VEHICLE INTEGRATED STABILITY CONTROL USING PERCEIVED YAW CENTER

(71) Applicant: GM GLOBAL TECHNOLOGY OPERATIONS LLC, Detroit, MI (US)

(72) Inventors: SeyedAlireza Kasaiezadeh Mahabadi, Novi, MI (US); Seyedeh Asal Nahidi, North York (CA); Michael W. Neal, Fenton, MI (US); James H. Holbrook, Fenton, MI (US); Hualin Tan, Novi, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 23 days.

(21) Appl. No.: 16/795,004

(22) Filed: Feb. 19, 2020

(65) Prior Publication Data
US 2021/0255629 A1    Aug. 19, 2021

(51) Int. Cl.
*G05D 1/02*    (2020.01)
*G05D 1/00*    (2006.01)

(52) U.S. Cl.
CPC ......... *G05D 1/0212* (2013.01); *G05D 1/0088* (2013.01)

(58) Field of Classification Search
CPC ...... G05D 1/0088; G05D 1/0212; G05D 1/02; B60W 30/02; B60W 40/00; B60W 10/06; B60K 17/3515

USPC ........................................................... 701/25
See application file for complete search history.

(56) References Cited

U.S. PATENT DOCUMENTS

| | | | |
|---|---|---|---|
| 6,658,342 B1* | 12/2003 | Hac | B60T 8/1755 303/140 |
| 8,073,607 B2 | 12/2011 | Sidlosky et al. | |
| 8,565,993 B2* | 10/2013 | Lu | B60W 30/045 701/70 |
| 8,684,115 B2 | 4/2014 | Bryant | |
| 10,183,568 B2* | 1/2019 | Jung | B60K 17/02 |
| 10,407,034 B2 | 9/2019 | Mahabadi et al. | |
| 2008/0208406 A1 | 8/2008 | Chen et al. | |
| 2009/0012669 A1* | 1/2009 | Takenaka | B60W 10/10 701/31.4 |
| 2010/0082195 A1* | 4/2010 | Lee | G01C 21/12 701/25 |
| 2010/0198445 A1 | 8/2010 | O'Dea et al. | |
| 2013/0006440 A1 | 1/2013 | Petrucci et al. | |
| 2015/0183289 A1* | 7/2015 | Koumura | B60G 17/0161 701/38 |
| 2016/0016591 A1* | 1/2016 | Yokota | B60W 30/045 701/34.4 |
| 2017/0101108 A1* | 4/2017 | Singh | G01M 17/02 |
| 2017/0267280 A1* | 9/2017 | Mahabadi | B60W 40/00 |
| 2019/0256094 A1 | 8/2019 | Kasaiezadeh Mahabadi et al. | |
| 2020/0318971 A1* | 10/2020 | Mori | G01C 21/165 |

(Continued)

*Primary Examiner* — Yazan A Soofi
(74) *Attorney, Agent, or Firm* — Cantor Colburn LLP (57) ABSTRACT

A vehicle, system and method of operating a vehicle. A sensor for measures a dynamic variable of the vehicle. A processor determines a location of a perceived yaw center (PYC) of the vehicle from the dynamic variable, tracks a desired location of the PYC, and adjusts a control parameter of the vehicle to reduce a difference between the location of the PYC and the desired location of the PYC.

20 Claims, 7 Drawing Sheets

(56) References Cited

U.S. PATENT DOCUMENTS

2020/0339135 A1 10/2020 Kasaiezadeh Mahabadi et al.
2020/0394907 A1* 12/2020 Takamori .............. B60W 40/02

* cited by examiner

SYSTEM AND METHOD FOR VEHICLE INTEGRATED STABILITY CONTROL USING PERCEIVED YAW CENTER

INTRODUCTION

The subject disclosure relates to controlling a vehicle's stability in a turn and, in particular, to a system and method for calculating a perceived yaw center of a vehicle and controlling the vehicle based on the perceived yaw center.

In controlling a vehicle using conventional methods, a controller maintains current commands as long as a lateral velocity of the vehicle is within an acceptable range. However, in performance vehicles, the lateral velocity can move beyond this range into a non-linear range of motion. Tracking a vehicle's lateral velocity thus does not provide the ability to improve a vehicle's response in this non-linear range. Accordingly, it is desirable to provide a method of controlling a stability of a vehicle as the lateral velocity of the vehicle changes.

SUMMARY

In one embodiment, a method of operating a vehicle is disclosed. A location of a perceived yaw center (PYC) of the vehicle is determined from a dynamic variable of the vehicle. A desired location of the PYC is tracked. A control parameter of the vehicle is adjusted to reduce a difference between the location of the PYC and the desired location of the PYC.

In addition to one or more of the features described herein, the location of the PYC is determined by determining the location at which a lateral velocity is equal to zero. In one embodiment, a lateral velocity is calculated for a yaw rate of the vehicle. The location of the PYC can be determined by determining the location at which a lateral acceleration is equal to zero. The location of the PYC can be determined using a recursive least squares process. The control parameter is adjusted to control a stability of the vehicle.

In another embodiment, a system for operating a vehicle is disclosed. The system includes a sensor for measuring a dynamic variable of the vehicle, and a processor. The processor is configured to determine a location of a perceived yaw center (PYC) of the vehicle from the dynamic variable, track a desired location of the PYC, and adjust a control parameter of the vehicle to reduce a difference between the location of the PYC and the desired location of the PYC.

In addition to one or more of the features described herein, the processor is further configured to determine the location of the PYC by determining the location at which a lateral velocity is equal to zero. In one embodiment, the processor is further configured to calculate a lateral velocity for a yaw rate of the vehicle. The processor is further configured to determine the location of the PYC by determining the location at which a lateral velocity is equal to zero. The processor is further configured to determine the PYC using a recursive least squares process. The processor is further configured to adjust the control parameter to control a stability of the vehicle. The processor is further configured to determine the location of the PYC based on the adjustment to the control parameter.

In yet another embodiment, a vehicle is disclosed. The vehicle includes a sensor for measuring a dynamic variable of the vehicle, and a processor. The processor is configured to determine a location of a perceived yaw center (PYC) of the vehicle from the dynamic variable, track a desired location of the PYC, and adjust a control parameter of the vehicle to reduce a difference between the location of the PYC and the desired location of the PYC.

In addition to one or more of the features described herein, the processor is further configured to determine the location of the PYC by determining the location at which a lateral velocity is equal to zero. In one embodiment, the processor is further configured to calculate a lateral velocity for a yaw rate of the vehicle. The processor is further configured to determine the location of the PYC by determining the location at which a lateral velocity is equal to zero. The processor is further configured to determine the PYC using a recursive least squares process. The processor is further configured to adjust the control parameter to control a stability of the vehicle. The processor is further configured to determine the location of the PYC based on the adjustment to the control parameter.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
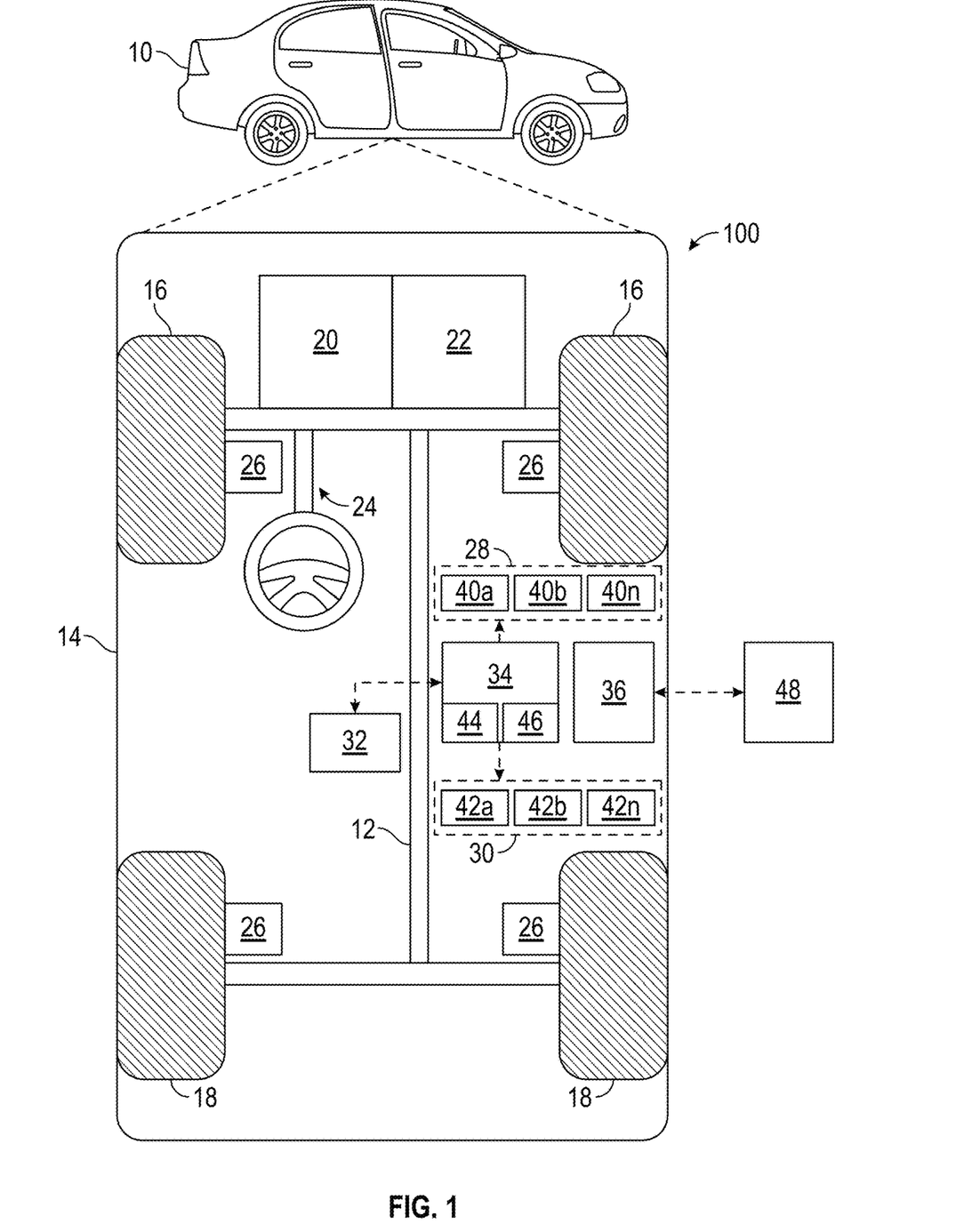
FIG. 1 shows a vehicle including an associated trajectory planning system in accordance with various embodiments.

In accordance with an exemplary embodiment, FIG. 1 shows a vehicle 10 including an associated trajectory planning system shown generally at 100 in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16 and 18 are each rotationally coupled to the chassis 12 near a respective corner of the body 14.

In various embodiments, the vehicle 10 is an autonomous vehicle and the trajectory planning system 100 is incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The sensor system 28 can also include sensors for measuring a kinematic parameter or dynamic variable of the vehicle, such as a longitudinal velocity lateral velocity, longitudinal acceleration, lateral acceleration, yaw angle, yaw rate, etc., or parameters that can be used to calculate these dynamic variables.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but not limited to, doors, a trunk, and cabin features such as air, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the trajectory planning system 100 and, when executed by the processor 44, generate a trajectory output that addresses kinematic and dynamic constraints of the environment. In an example, the instructions received are input process sensor and map data. The instructions perform a graph-based approach with a customized cost function to handle different road scenarios in both urban and highway roads.

Figure 2:
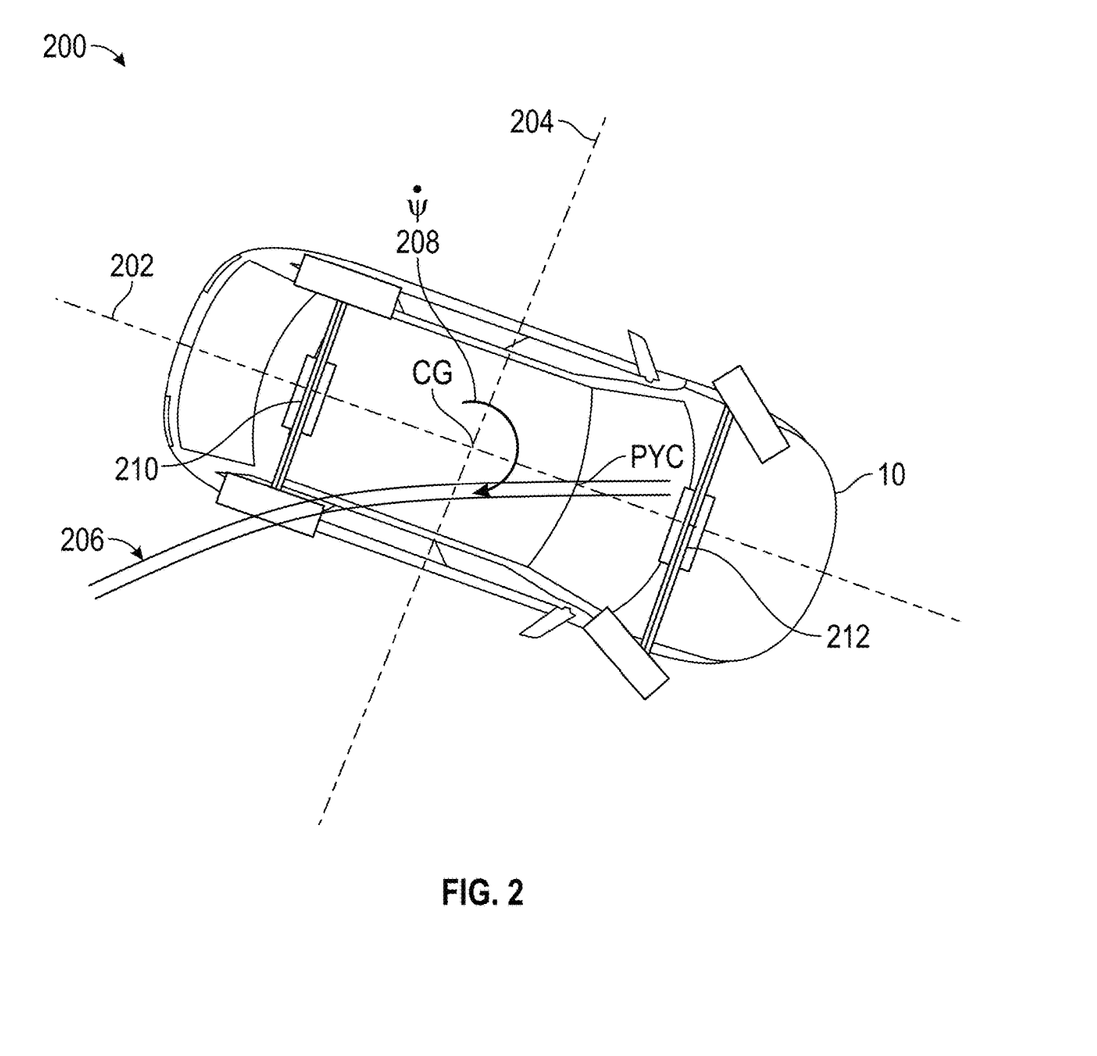
FIG. 2 shows a top view of the vehicle depicting the various performance mode operators of the vehicle.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The processor 44 further includes programs for operating the vehicle in at least one of two modes of operation; a standard mode of operation, and a performance mode of operation. In the standard mode of operation, the processor 44 operates a standard simulation model of the vehicle that provides a linear relation between driver's inputs and vehicle dynamics. The standard simulation model receives driver's inputs and determines a dynamic variable of the vehicle based on the driver's inputs. The standard simulation model generates actuator commands for the actuators of the vehicle and the processor 44 sends these commands to the actuators in order to generate the dynamic variable at the vehicle. A dynamic variable in the standard mode can include a yaw rate of the vehicle, longitudinal velocity lateral velocity, longitudinal acceleration, and/or lateral acceleration, for example.

In the performance mode of operation, the processor 44 operates a performance simulation model of the vehicle 10. The performance simulation model is generally a non-linear model of the vehicle and generally takes in more input than the standard simulation model in order to determine a dynamic parameter for the vehicle. For example, the standard simulation model generally takes a driver's steering wheel angle as an input, while the performance simulation model generally takes a tractive torque on a tire and a braking torque on the tire in addition to the steering wheel angle in order to determine the dynamic parameter. Thus, the performance simulation model includes inputs from the accelerator pedal and brake pedal in addition to the steering wheel angle in order to define the dynamic states of the vehicle 10. The performance mode further uses several actuators that are not used in the standard mode of operation, as shown in FIG. 2.

FIG. 2 shows a top view 200 of the vehicle 10 depicting the various performance mode operators of the vehicle 10. An electronically-limited slip differential actuator (eLSD) 210 is located between the rear wheels and controls a left-right torque distribution at the vehicle. An electronic All-Wheel Drive actuator (eAWD) 212 is located between the front wheels and controls a front-back torque-distribution at the vehicle. The vehicle can also include an Active-Aero actuator (not shown) helps to control the normal force on the tires of the vehicle 10, as well as a differential braking actuator (not shown).

FIG. 2 shows the vehicle 10 moving along a selected trajectory 206 through a turn or rotation. The selected trajectory 206 can include an oversteered trajectory, an understeered trajectory, a normal trajectory, and non-slip and slip trajectories, for example. The yaw rate $\dot{\psi}$ is indicated by rotational arrow 208. In various operations, the trajectory includes a turn or rotation of the vehicle that introduces various forces and moment of the vehicle.

The vehicle includes a center of gravity (CG) through which both longitudinal symmetry plane 202 and lateral symmetry plane 204 pass. The vehicle 10 further includes a perceived yaw center (PYC). A perceived yaw center is a conceptual point of a vehicle within a body-centered coordinate system of the vehicle. The perceived yaw center is the point that the driver inside the car interprets as an instant center of rotation for the vehicle body. Also, the perceived yaw center can be defined as a point where relative lateral velocity and acceleration vanishes. A location of the perceived yaw center changes instantaneously during handling of the vehicle and is affected by the yaw and lateral motion of the vehicle.

Figure 3:
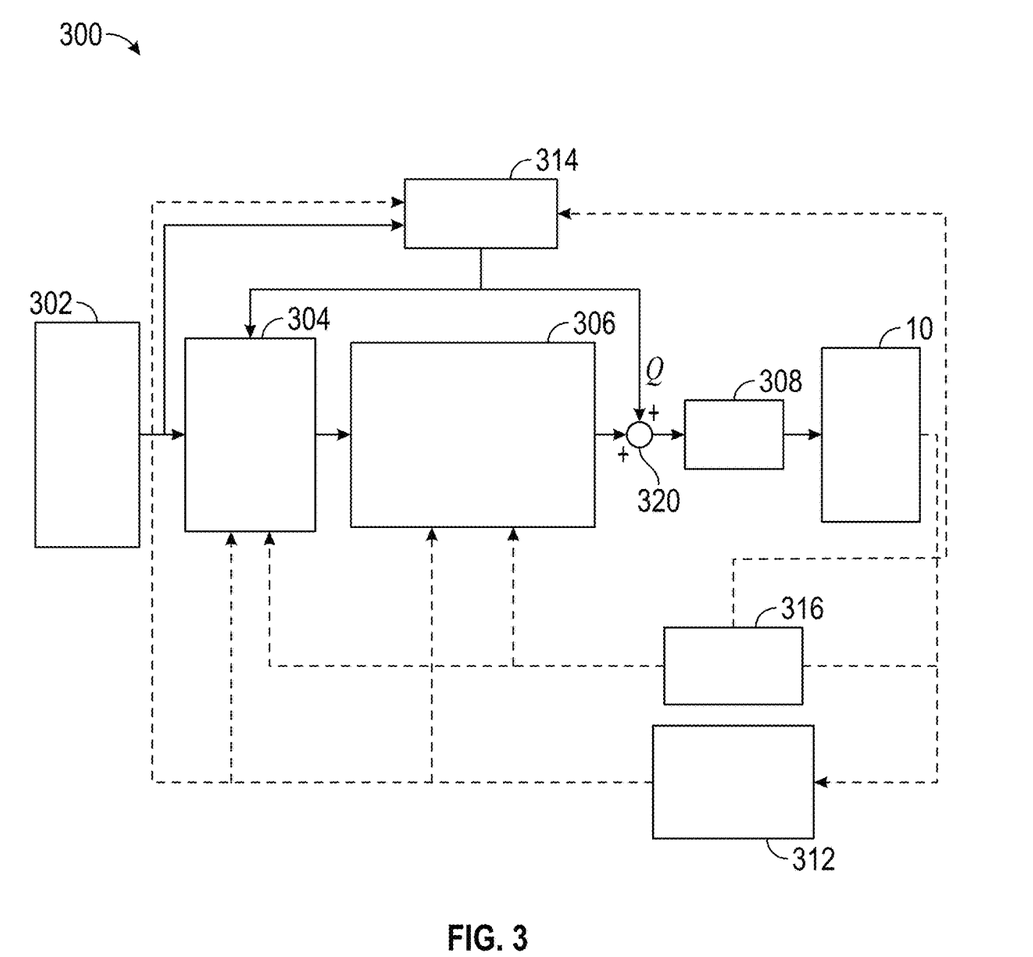
FIG. 3 shows a control system architecture for operating the vehicle in a driver-assisted or performance mode.

FIG. 3 shows a control system architecture 300 for operating the vehicle 10 in a driver-assisted or performance mode. In various aspects, the control system architecture 300 includes various modules that operate on the processor 44 in order to translate a driver's intentions into actual motion of the vehicle. The control system architecture 300 includes a target state determination module 304, a vehicle control module 306, and actuators 308. The target state determination module 304 determines a desired state of the vehicle based on a driver's inputs. The vehicle control module 306 determines a command control adjustment based on the desired state and operates actuators 308 in order to control the vehicle 10.

The control system architecture 300 receives driver inputs 302, such as a steering wheel angle, a brake pedal position and an accelerator pedal position. The driver's inputs 302 are provided to the target state determination module 304. The target state determination module 304 computes a desired state ($S_d$) based on the driver's inputs and provides the desired state $S_d$ to the vehicle control module 306. The desired state $S_d$ can include, but is not limited to, a desired yaw rate, desired side slip angle, desired lateral velocity, and/or desired PYC of the vehicle 10. The driver's inputs are also provided to a feedforward control module 314.

The vehicle control module 306 generates an actuator adjustment command ($\delta Q$) for the vehicle based on the desired state $S_d$. The actuator adjustment command $\delta Q$ can be added to an actuator command (Q) that corresponds to the driver's inputs at summation circuit 320. The actuator command Q is provided from the feedforward control module 314. The summation (Q+$\delta Q$) is provided to the actuators 308 in order to provide an action $Q_a$ that operates the vehicle 10. The actuators can include, for example, the eLSD, 210 the eAWD 212, the differential braking actuator (dB) and the Active-Aero actuator. The actuators are used to generate the desired states (e.g., yaw rate, side slip angle, lateral velocity, PYC) at the vehicle 10. In various embodiments, the actuator commands can be adjusted to ensure that they do not exceed a capacity of either the tires of the vehicle or of the road.

The vehicle 10 thus undergoes the desired dynamic state, such as the desired yaw rate and/or the desired side slip angle. Sensors 316 on the vehicle 10 can detect these dynamic variables and their values. Alternatively, sensors 316 can obtain measurements that can be used to determine these dynamic variables. In addition, a vehicle state estimate and fault detection module 312 can estimate the values of these dynamic variables. The sensed values of these dynamic variables and the estimated values of these dynamic variables can be provided to the vehicle control module 306 in order to help the vehicle control module 306 determine the command actuator adjustment $\delta Q$ for a next time step of the vehicle control. These sensed and estimated values can also be provided to the target state determination module 304 in order to control calculation of the desired state $S_d$. Such feedback prevents the desired state $S_d$ generated by the target state determination module 304 from changing too rapidly. Sensors 316 can further provide the sensed values and estimated values to the feedforward control module 314.

Figure 4:
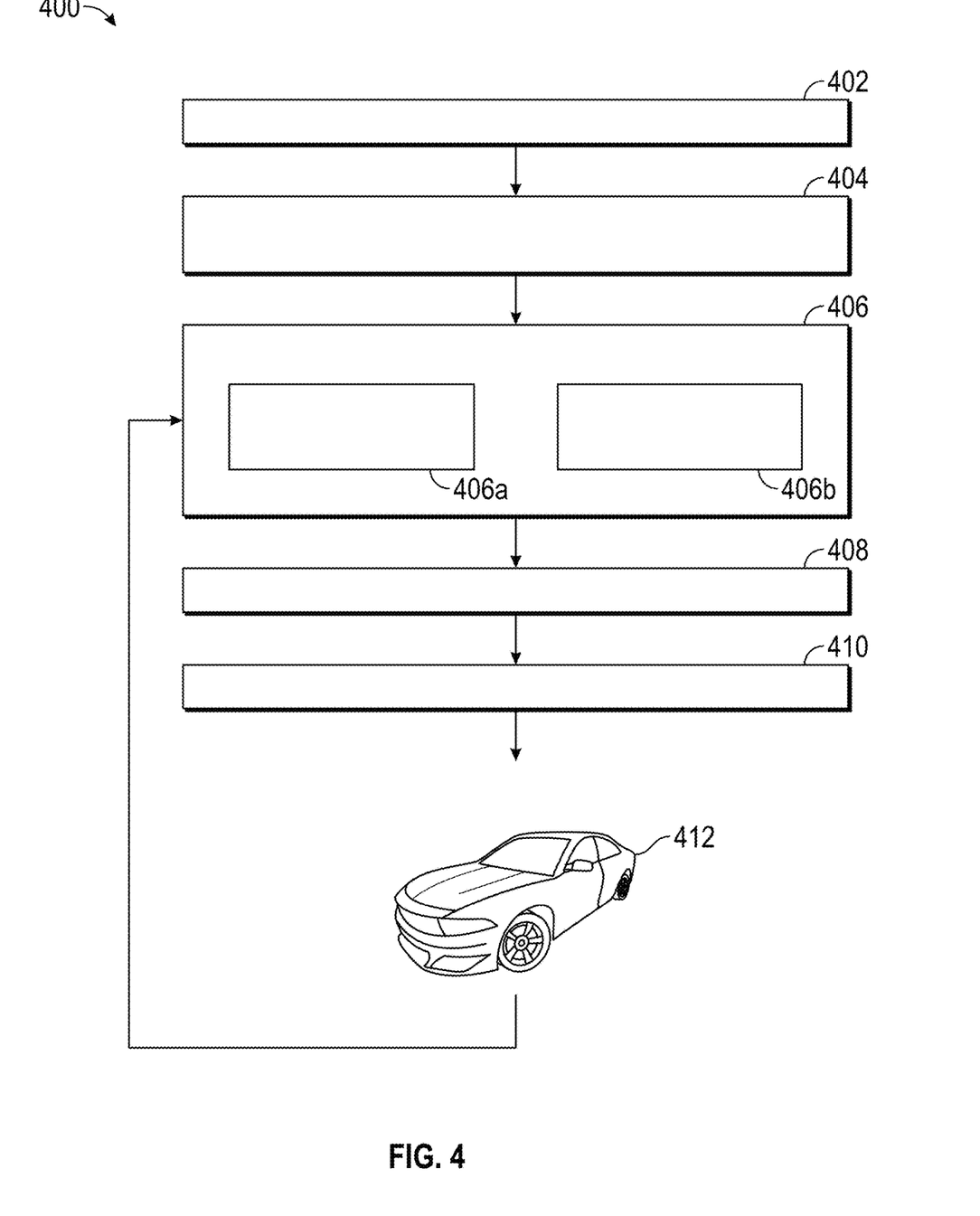
FIG. 4 shows a flowchart illustrating a method for determining a perceived yaw center of a vehicle and operating a vehicle based on the perceived yaw center.

FIG. 4 shows a flowchart 400 illustrating a method for determining a perceived yaw center of a vehicle and operating a vehicle based on the perceived yaw center. In box 402, sensor measurements are obtained. In box 404, the sensor measurements are input to a vehicle model in order to determine various dynamic or kinematic parameters of the vehicle, such as lateral velocity, longitudinal velocity, yaw rate, lateral acceleration, longitudinal acceleration, etc. In box 406, the perceived yaw center is determined using the dynamic variables. The perceived yaw center can be determined using either a velocity-based estimation process (box 406a) or an acceleration-based estimation process (box 406b). In box 408, an optimal or desired location of the perceived yaw center is calculated. In box 410, the desired location of the perceived yaw center is tracked through the vehicle control module 306. In box 412, an adjustment is made to a control setting of the vehicle or an actuator of the vehicle in order to align the determined perceived yaw center with the desired perceived yaw center.

Once the adjustment is made, the method returns to box 406 in which the location of the perceived yaw center is once again determined based on settings resulting from the changes made at the controller. The velocity-based method for determining the location of the perceived yaw center (box 406a) is discussed below with respect to FIGS. 5 and 6. The acceleration-based method for determining the location of the perceived yaw center (box 406b) is discussed with respect to FIGS. 7 and 8.

Figure 5:
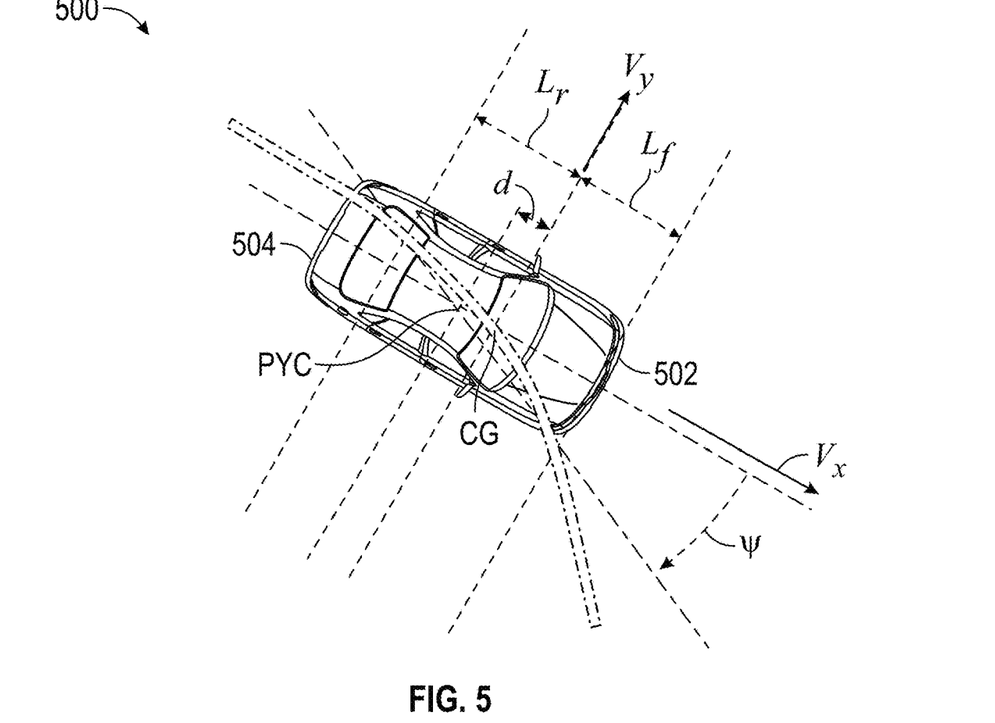
FIG. 5 shows a top view of a vehicle undergoing a turn.

FIG. 5 shows a top view 500 of a vehicle undergoing a turn. Illustrated therein is a center of gravity (CG), a front axle-CG separation $L_f$ between the CG and a front end 502 of the vehicle 10, and a rear axle-CG separation $L_r$ between the CG and a back end 504 of the vehicle 10. Distance d represents a separation distance between the CG and the perceived yaw center (PYC) of the vehicle 10. Further illustrated in FIG. 5 is a longitudinal velocity ($v_x$), lateral velocity ($v_y$) and yaw rotation ($\psi$) of the vehicle.

Using the velocity-based method, the perceived yaw center is defined as a point where the lateral velocity is zero. The perceived yaw center therefore is defined as the point where Eq. (1) holds:

$$v_y + d\gamma \approx 0 \quad \text{Eq. (1)}$$

where $v_y$ is the lateral velocity of the center of gravity, $\gamma$ is a yaw rate of the vehicle and d is the distance between the perceived yaw center and the center of gravity. The perceived yaw center can be determined from Eq. (1) using a recursive least squares (RLS) process as shown in Eq. (2):

$$\min_{\hat{\theta}} \sum_{i=1}^{t} \lambda^{t-1} [\eta^T(i-1)\theta(i) - p(i)]^2 \quad \text{Eq. (2)}$$

where $\theta(i)=d$, $\eta(i)=\gamma$, $p(i)=v_y$. The value t represents a total number of time steps, with measurements of the lateral velocity and yaw rate being taken at each time step. Index i indicates an individual time step. A forgetting factor (i.e., $\lambda$) can be used to enhance a sensitivity of the RLS process. The term $\eta^T(i-1)\theta(i)$ therefore gives a predictive value of the lateral velocity based on a measured yaw rate and the location of the perceived yaw center. The velocity term p(i) gives a measured value of the lateral velocity at the $i^{th}$ measurement step. The cost function of Eq. (2) is minimized at the optimal location for the PYC.

Figure 6:
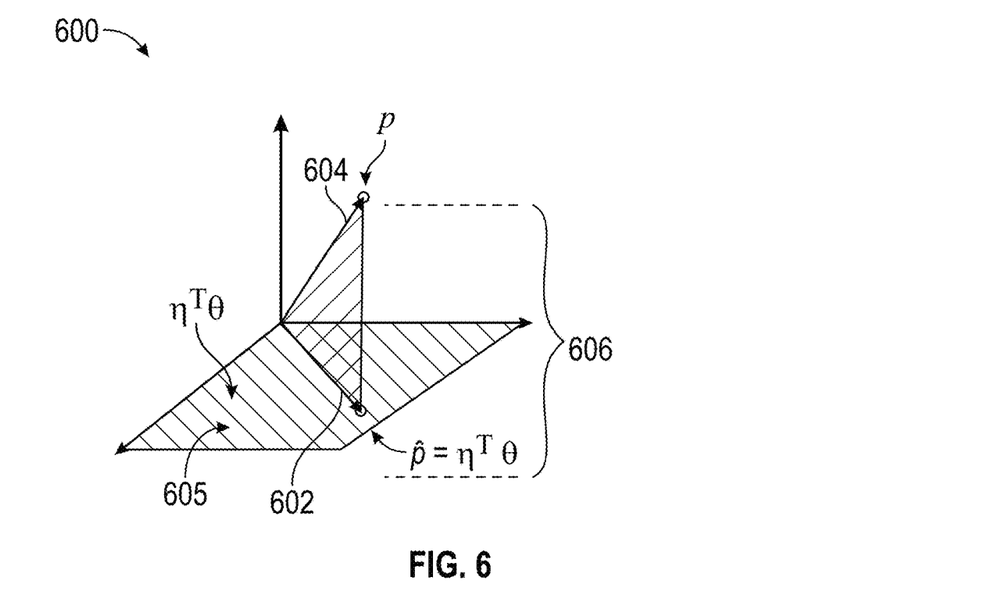
FIG. 6 shows a visual representation of the lateral velocities of the recursive least squares process.

FIG. 6 shows a visual representation 600 of the lateral velocities of the recursive least squares process. Vector 602 represents the velocity term $\eta^T(i-1)\theta(i)$, which lies within a velocity plane 605 defined by values for the term based on all possible values for the location of the perceived yaw center. Vector 604 represents the velocity term y(i) which extends out of the velocity plane 605. The difference between vector 602 and vector 604 is the least square error 606 of the RLS process. The recursive least squares process operates in order to reduce this least square error 606.

Figure 7:
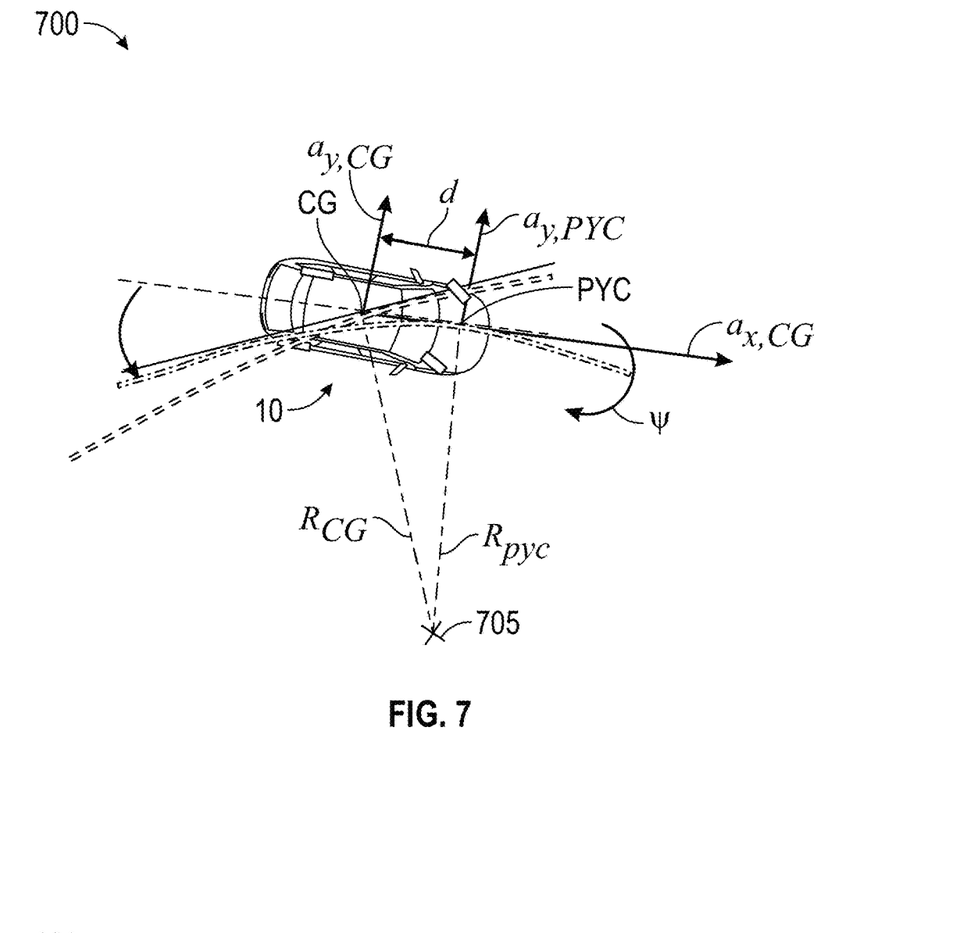
FIG. 7 depicts a top view of the vehicle showing various accelerations on the vehicle.

FIG. 7 depicts a top view 700 of the vehicle showing various accelerations on the vehicle 10. The vehicle includes the center of gravity CG and a perceived yaw center PYC at a distance d away from the center of gravity CG. The center of gravity CG is shown at a distance $R_{CG}$ from a stationary reference point 705 in a global coordinates frame of reference. The perceived yaw center PYC is shown at a distance $R_{PYC}$ from the stationary reference point 705. The center of gravity CG experiences a lateral acceleration $a_{y,CG}$ and the perceived yaw center PYC experiences a lateral acceleration $a_{y,PYC}$ when the vehicle experiences a yaw rotation $\psi$.

Figure 8:
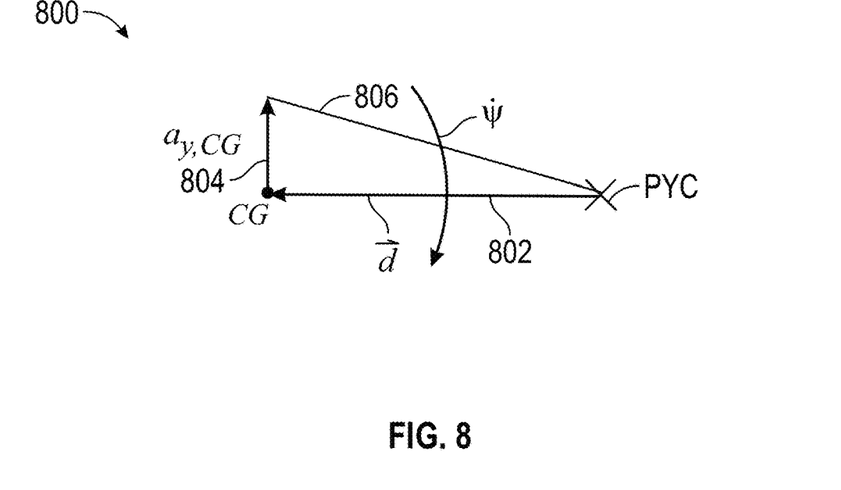
FIG. 8 depicts a force diagram showing vectorially the forces on the center of gravity and perceived yaw center resulting in no lateral acceleration at the perceived yaw center.

FIG. 8 depicts a force diagram 800 showing vectorially the forces on the center of gravity CG and perceived yaw center PYC resulting in no lateral acceleration at the perceived yaw center. The center of gravity CG is separated from the perceived yaw center (PYC) by distance vector $\vec{d}$ 802. The center of gravity CG experiences lateral acceleration indicated by vector $\vec{a}_{y,CG}$ 804. The yaw rate $\dot{\psi}$ 806 counteracts the lateral velocity $\vec{v}_{y,CG}$ such that the lateral velocity of the perceived yaw center and the lateral acceleration is equal to zero. Equations for the acceleration-based method of determining the PYC are discussed below.

According to rigid body dynamics, the acceleration of a point P with respect to a reference point O can be written as:

$$\vec{a}_P = \vec{a}_O + \vec{\psi} \times (\vec{\psi} \times \vec{d}) + \vec{\dot{\psi}} \times \vec{d} + 2\vec{\psi} \times \times \vec{V}_{rel} + \vec{a}_{rel} \quad \text{Eq. (3)}$$

where $a_P$ is acceleration of the point P and $a_O$ is acceleration of the point O. $V_{rel}$ is a relative velocity and $a_{rel}$ is a relative acceleration. For the illustrative embodiments, $V_{rel}$ and $a_{rel}$ are both zero. By placing the reference point O at the center of gravity CG, Eq. (3) can be rewritten as Eq. (4):

$$\vec{a}_P = (a_{xCG}\vec{i} + a_{yCG}\vec{j}) + \dot{\psi}\vec{k} \times (\dot{\psi}\vec{k} \times d\vec{i}) + \ddot{\psi}\vec{k} \times d\vec{i} + 2\dot{\psi}\vec{k} \times \vec{V}_{rel} \quad \text{Eq. (4)}$$

which simplifies to:

$$\vec{a}_P = (a_{xCG} - \dot{\psi}^2 d)\vec{i} + (a_{yCG} - \ddot{\psi}d)\vec{j} \quad \text{Eq. (5)}$$

The acceleration for any arbitrary point P can also be written in a global coordinates reference frame as:

$$\vec{a}_P = (R_P\ddot{\psi} + 2\dot{\psi}\dot{R}_P)\vec{i} + (\ddot{v}_{yP} + R_P\dot{\psi}^2)\vec{j} \quad \text{Eq. (6)}$$

where $R_p$ is the distance between point P and stationary reference point 705. By placing the arbitrary point P at the perceived yaw center (i.e., $R_P \rightarrow R_{PYC}$), then:

$$\dot{v}_{yP} = 0 \quad \text{Eq. (7)}$$

It can also reasonably be assumed that:

$$d << R_{CG} \quad \text{Eq. (8)}$$

Under the assumptions of Eq. (7) and Eq. (8), the distance $R_{CG}$ is approximately equal to distance $R_{PYC}$, as shown in E. (9):

$$R_{CG} \approx R_{PYC} \quad \text{Eq. (9)}$$

With yaw rate defined as in Eq. (10):

$$\dot{\psi} = v_{x,CG}/R_{CG} \quad \text{Eq. (10)}$$

then:

$$R_{PYC}\dot\psi^2 = \dot\psi v_{x,CG} \frac{R_{PYC}}{R_{CG}} \sim \dot\psi v_{x,CG} \qquad \text{Eq. (11)}$$

Therefore, it can be concluded that:

$$\ddot\psi \times d = (a_{y,CG} - \dot\psi \times v_{x,CG}) = \dot v_{y,CG} \qquad \text{Eq. (12)}$$

The recursive least squares process of Eq. (2) then be used with the variables of Eq. (12), with θ(i)=d, η(i)=ψ̈ and p(i)=$a_{y,CG}$ to estimate the distance d, thereby determining the location of the perceived yaw center.

The existing controller of the vehicle can control the yaw rate and lateral velocity of the vehicle. Yaw rate and lateral velocity are elements defining a main vehicle handling state X. A controller cost function can therefore be created and minimized in order to achieve desired states $X_{des}$ and PYC location, as shown in Eq. (13):

$$\min_{U_0}(X-X_{des})^T \overline{Q}(X-X_{des}) + U_0^T \overline{R} U_0 \qquad \text{Eq. (13)}$$

where $$X = \begin{Bmatrix} v_{y,CG} \\ \dot\psi \\ d_{PYC} \end{Bmatrix} \qquad \text{Eq. (14)}$$

and $$X_{des} = \begin{Bmatrix} v_{y,CG} \\ \dot\psi \\ d_{PYC} \end{Bmatrix}_{des} \qquad \text{Eq. (15)}$$

Figure 9:
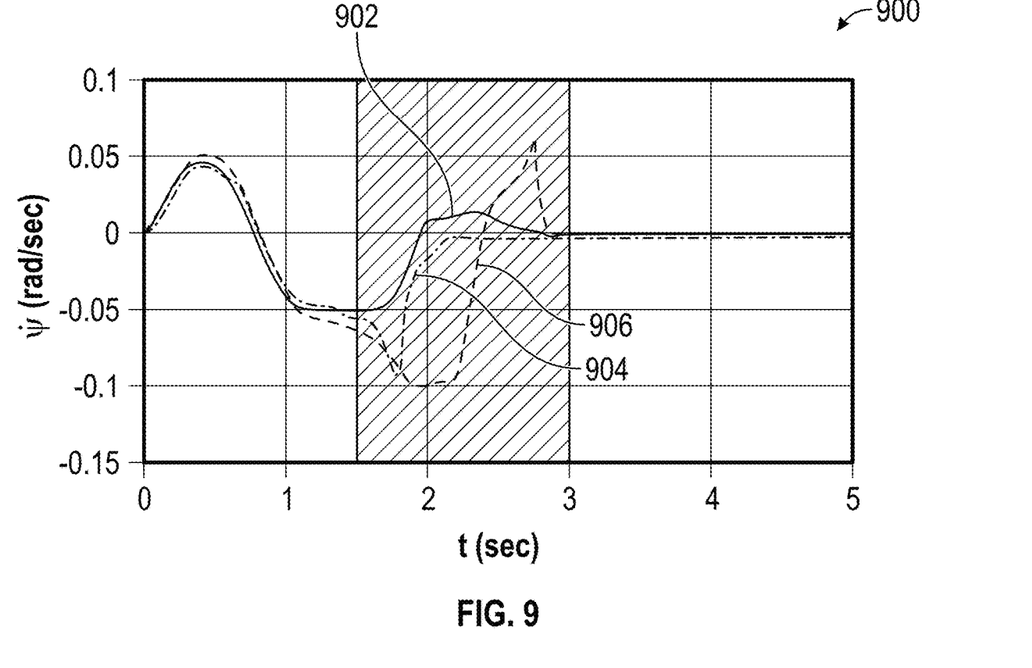
FIG. 9 shows a graph of yaw tracking for the vehicle with respect to a desired yaw tracking.

FIG. 9 shows a graph 900 of yaw tracking for the vehicle with respect to a desired yaw tracking. Yaw rate is shown along the y-axis in radians/second and time is shown along the x-axis in seconds. Curve 902 shows a desired yaw rate to be tracked. Curve 904 shows a yaw rate when a control is applied to the vehicle. Curve 906 shows a yaw rate when the control is not applied to the vehicle. Curve 904 tracks the desired yaw rate (curve 902) to a greater degree that curve 906.

Figure 10:
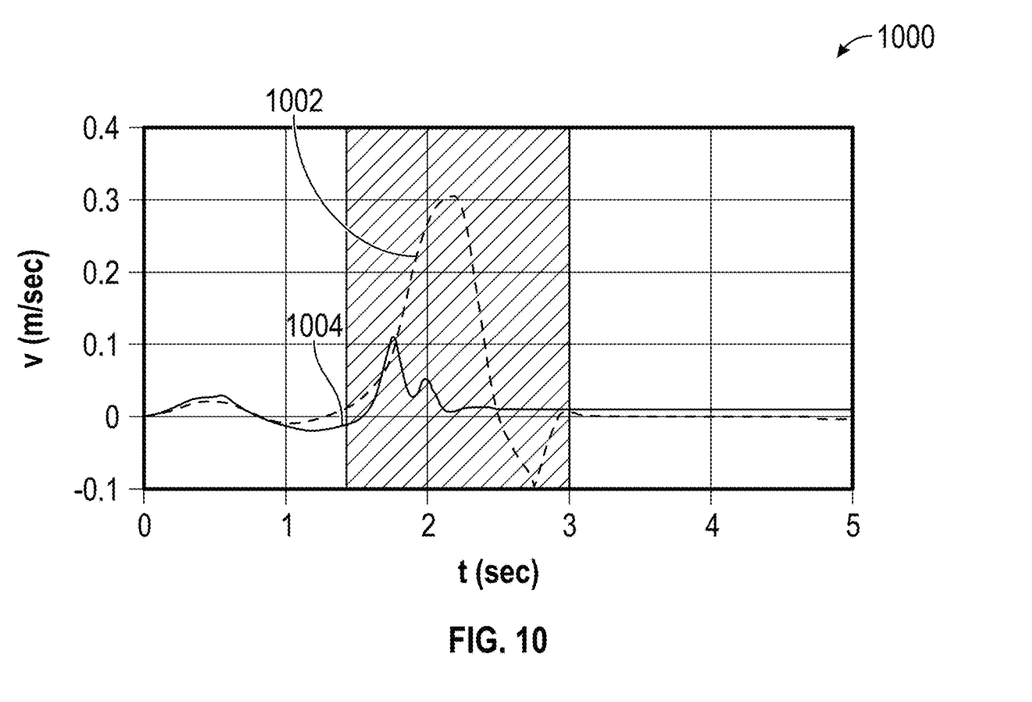
FIG. 10 shows a graph of lower lateral skidding for the vehicle.

FIG. 10 shows a graph 1000 of lower lateral skidding for the vehicle. Lateral velocity is shown along the y-axis in meters/second and time is shown along the x-axis in seconds. Curve 1002 shows lateral skidding with the control off. Curve 1004 shows lateral skidding with the control on. Curve 1004 shows greater control of the lower lateral skidding than curve 1004.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of operating a vehicle, comprising:
   determining a location of a perceived yaw center (PYC) of the vehicle from a dynamic variable of the vehicle;
   tracking a desired location of the PYC; and
   adjusting a control parameter of the vehicle to reduce a difference between the location of the PYC and the desired location of the PYC.

2. The method of claim 1, further comprising determining the location of the PYC by determining the location at which a lateral velocity is equal to zero.

3. The method of claim 1, further comprising calculating a lateral velocity for a yaw rate of the vehicle.

4. The method of claim 1, determining the location of the PYC by determining the location at which a lateral acceleration is equal to zero.

5. The method of claim 1, further comprising determining the location of the PYC using a recursive least squares process.

6. The method of claim 1, further comprising adjusting the control parameter to control a stability of the vehicle.

7. A system for operating a vehicle, comprising:
   a sensor for measuring a dynamic variable of the vehicle; and
   a processor configured to:
      determine a location of a perceived yaw center (PYC) of the vehicle from the dynamic variable;
      track a desired location of the PYC; and
      adjust a control parameter of the vehicle to reduce a difference between the location of the PYC and the desired location of the PYC.

8. The system of claim 7, wherein the processor is further configured to determine the location of the PYC by determining the location at which a lateral velocity is equal to zero.

9. The system of claim 7, wherein the processor is further configured to calculate a lateral velocity for a yaw rate of the vehicle.

10. The system of claim 7, wherein the processor is further configured to determine the location of the PYC by determining the location at which a lateral velocity is equal to zero.

11. The system of claim 7, wherein the processor is further configured to determine the PYC using a recursive least squares process.

12. The system of claim 7, wherein the processor is further configured to adjust the control parameter to control a stability of the vehicle.

13. The system of claim 12, wherein the processor is further configured to determine the location of the PYC based on the adjustment to the control parameter.

14. A vehicle, comprising:
   a sensor for measuring a dynamic variable of the vehicle; and
   a processor configured to:
      determine a location of a perceived yaw center (PYC) of the vehicle from the dynamic variable;
      track a desired location of the PYC; and
      adjust a control parameter of the vehicle to reduce a difference between the location of the PYC and the desired location of the PYC.

15. The vehicle of claim 14, wherein the processor is further configured to determine the location of the PYC by determining the location at which a lateral velocity is equal to zero.

16. The vehicle of claim 14, wherein the processor is further configured to calculate a lateral velocity for a yaw rate of the vehicle.

17. The vehicle of claim 14, wherein the processor is further configured to determine the location of the PYC by determining the location at which a lateral velocity is equal to zero.

18. The vehicle of claim 14, wherein the processor is further configured to determine the PYC using a recursive least squares process.

19. The vehicle of claim 14, wherein the processor is further configured to adjust the control parameter to control a stability of the vehicle.

20. The vehicle of claim 19, wherein the processor is further configured to determine the location of the PYC based on the adjustment to the control parameter.

\* \* \* \* \*